United States Patent
Ito

(10) Patent No.: US 12,553,176 B2
(45) Date of Patent: Feb. 17, 2026

(54) TREATMENT AGENT FOR CARBON FIBER PRECURSOR, COMPOSITION CONTAINING TREATMENT AGENT FOR CARBON FIBER PRECURSOR, AND CARBON FIBER PRECURSOR

(71) Applicant: Takemoto Oil & Fat Co., Ltd., Gamagori (JP)

(72) Inventor: Jun Ito, Gamagori (JP)

(73) Assignee: Takemoto Oil & Fat Co., Ltd., Gamagori (JP)

( * ) Notice: Subject to any disclaimer, the term of this patent is extended or adjusted under 35 U.S.C. 154(b) by 0 days.

(21) Appl. No.: 18/714,533

(22) PCT Filed: Nov. 22, 2022

(86) PCT No.: PCT/JP2022/043100
§ 371 (c)(1),
(2) Date: May 29, 2024

(87) PCT Pub. No.: WO2023/100711
PCT Pub. Date: Jun. 8, 2023

(65) Prior Publication Data
US 2024/0328071 A1 Oct. 3, 2024

(30) Foreign Application Priority Data

Dec. 2, 2021 (JP) ................................ 2021-196190

(51) Int. Cl.
*D06M 11/74* (2006.01)
*D06M 13/165* (2006.01)
*D06M 15/643* (2006.01)
*D06M 101/28* (2006.01)

(52) U.S. Cl.
CPC .......... *D06M 11/74* (2013.01); *D06M 13/165* (2013.01); *D06M 15/6436* (2013.01); *D06M 2101/28* (2013.01); *D06M 2200/40* (2013.01)

(58) Field of Classification Search
CPC ............... D06M 11/74; D06M 13/165; D06M 2101/28; D06M 2101/40; D06M 2200/40; D01F 9/12
See application file for complete search history.

(56) References Cited

U.S. PATENT DOCUMENTS

| | | | |
|---|---|---|---|
| 4,275,051 A | 6/1981 | Barr | |
| 4,276,278 A | 6/1981 | Barr et al. | |
| 8,951,632 B2 * | 2/2015 | Shah | B01J 23/75 |
| | | | 977/750 |
| 2010/0178825 A1 * | 7/2010 | Shah | D04H 1/76 |
| | | | 428/300.1 |
| 2015/0292118 A1 | 10/2015 | Korzhenko et al. | |

FOREIGN PATENT DOCUMENTS

| | | | | |
|---|---|---|---|---|
| CN | 104452270 A | 3/2015 | | |
| EP | 0014161 A2 * | 8/1980 | ............. | D01F 9/145 |
| JP | S55-128020 A | 10/1980 | | |
| JP | 2010007216 A * | 1/2010 | | |
| JP | 2012-021238 A | 2/2012 | | |
| JP | 2015-537125 A | 12/2015 | | |
| JP | 2016-060969 A | 4/2016 | | |
| JP | 6923978 B1 | 8/2021 | | |
| WO | WO 2009/028379 A1 | 3/2009 | | |
| WO | WO 2020/234168 A1 | 11/2020 | | |

OTHER PUBLICATIONS

Machine Translation of JP2010007216 (Year: 2010).*
Japanese Decision to Grant dated Jan. 6, 2022, in connection with Japanese Patent Application No. 2021-196190.
German Office Action dated Dec. 10, 2024, in connection with German Application No. 11 2022 005 207.4, with English translation thereof.
Chinese Office Action dated Nov. 15, 2024, in connection with Chinese Application 202280078603.6, with English translation.

* cited by examiner

*Primary Examiner* — Jennifer A Steele
(74) *Attorney, Agent, or Firm* — Wolf, Greenfield & Sacks, P.C.

(57) ABSTRACT

Disclosed is a carbon fiber precursor treatment agent that contains a carbon nanostructure and a surfactant. The carbon nanostructure is present in the nonvolatile matter of the carbon fiber precursor treatment agent at a content of 10 ppm or more and less than 50,000 ppm.

6 Claims, No Drawings

TREATMENT AGENT FOR CARBON FIBER PRECURSOR, COMPOSITION CONTAINING TREATMENT AGENT FOR CARBON FIBER PRECURSOR, AND CARBON FIBER PRECURSOR

CROSS REFERENCE TO RELATED APPLICATIONS

This Application is a national stage filing under 35 U.S.C. 371 of International Patent Application Serial No PCT/JP2022/043100, filed Nov. 22, 2022, which claims priority to Japanese Application No. 2021-196190, filed Dec. 2, 2021. The entire contents of these applications are incorporated herein by reference in their entirety.

TECHNICAL FIELD

The present invention relates to a carbon fiber precursor treatment agent containing a surfactant and a carbon nanostructure, a carbon fiber precursor treatment agent-containing composition containing the carbon fiber precursor treatment agent, and a carbon fiber precursor obtained by using the carbon fiber precursor treatment agent.

BACKGROUND ART

Carbon fibers are widely used in various fields such as building materials, transportation equipment, and medical equipment, as a carbon fiber composite material combined with a matrix resin such as epoxy resin. The carbon fiber is typically produced through a step of spinning, for example, an acrylic fiber as a carbon fiber precursor, and a step of firing the carbon fiber precursor. A carbon fiber precursor treatment agent may be used for the carbon fiber precursor in order to suppress sticking or fusion between fibers during the process of producing carbon fibers.

Patent Document 1 describes an invention related to an oil agent composition used as a carbon fiber precursor treatment agent. The oil agent composition contains conductive carbon-based fine particles, silicone, and a nonionic emulsifier.

CITATIONS LIST

Patent Literature

Patent Document 1: Japanese Laid-Open Patent Publication No. 2010-7216

SUMMARY OF INVENTION

Technical Problems

However, the conventional carbon fiber precursor treatment agent as described in Patent Document 1 has good antistatic properties and good sizing properties, but has a problem that carbon-based fine particles contained in the carbon fiber precursor treatment agent are likely to detach from the carbon fiber precursor. The carbon-based fine particles detached from the carbon fiber precursor adhere to the surface of the roller that conveys the fiber, causing deterioration in quality of the carbon fiber precursor, such as yarn breakage and fuzz. Therefore, the surface of the roller needs to be cleaned frequently, which causes a decrease in the production efficiency of the carbon fiber precursor.

There has been a demand for a carbon fiber precursor treatment agent capable of improving detachment prevention properties while improving antistatic properties.

Solutions to Problems

In order to solve the above problems and in accordance with the present invention, a carbon fiber precursor treatment agent contains a surfactant and a carbon nanostructure. The carbon nanostructure is present in the nonvolatile matter of the carbon fiber precursor treatment agent at a content of 10 ppm or more and less than 50,000 ppm.

In the present invention, ppm means ppm by mass.

In the above configuration, the carbon nanostructure may contain a carbon nanotube.

In the above configuration, the carbon nanotube may be a single-wall carbon nanotube.

In the above configuration, the carbon fiber precursor treatment agent may further contain silicone.

In order to solve the above problems and in accordance with the present invention, a carbon fiber precursor treatment agent-containing composition contains the carbon fiber precursor treatment agent and a solvent.

In order to solve the above problems and in accordance with the present invention, a carbon fiber precursor has the carbon fiber precursor treatment agent adhered thereto.

Advantageous Effects of Invention

The present invention succeeds in obtaining a carbon fiber precursor capable of improving detachment prevention properties while improving antistatic properties.

DESCRIPTION OF EMBODIMENTS

First Embodiment

A first embodiment embodying a carbon fiber precursor treatment agent (hereinafter referred to as "treatment agent") according to the present invention will now be described. The treatment agent contains a carbon nanostructure and a surfactant, and optionally further contains silicone.

<Carbon Nanostructure>

Examples of the carbon nanostructure include a carbon nanotube, a carbon nanofiber, and carbon black.

The carbon nanotube generally has a cylindrical structure in which a graphene sheet is wound around the center of a fiber. The carbon nanofiber generally has a structure in which graphene sheets are stacked obliquely or perpendicularly to the fiber length direction, with the edge surfaces of the graphene sheets exposed on the fiber surface. The carbon black is generally a particulate carbon having an average primary particle size of about 3 to 500 nm. Among them, the carbon nanotube is preferable from the viewpoint of further improving detachment prevention properties.

The carbon nanotube may be a single-wall carbon nanotube, composed of a single layer, or a multi-wall carbon nanotube, composed of multiple layers, such as a double-wall carbon nanotube with two layers. Among them, the single-wall carbon nanotube is preferable from the viewpoint of further improving antistatic properties.

In addition, the carbon nanotube may be of a zigzag type, an armchair type, or a chiral type, depending on the geometric structure of the carbon nanosheet, but may be any of these types. A chemically modified carbon nanotube, such as a carboxyl group-modified carbon nanotube, may also be used.

Specific examples of the carbon nanostructure include single-wall carbon nanotubes manufactured by Nanocyl SA, single-wall carbon nanotubes with the trade name TUBALL, manufactured by OCSiAl, double-wall carbon nanotubes manufactured by Nanocyl SA, multi-wall carbon nanotubes manufactured by Nanocyl SA, carboxyl group-modified multi-wall carbon nanotubes manufactured by Nanocyl SA, carbon nanofibers for reinforcement manufactured by ALMEDIO Inc., and carbon black having an average primary particle size of 23 nm. These carbon nanostructures may be used singly or in combination of two or more thereof.

<Surfactant>

The surfactant improves detachment prevention properties and spinning smoothness. The surfactant also improves the dispersion stability of the carbon nanostructure in the treatment agent.

Examples of the surfactant include anionic surfactants, cationic surfactants, nonionic surfactants, and amphoteric surfactants. These surfactants may be used singly or in combination of two or more thereof.

Any known nonionic surfactant can be appropriately used as the nonionic surfactant. Specific examples of the nonionic surfactant include (1) compounds obtained by adding an alkylene oxide to an alcohol, such as an alkylene oxide adduct of octyl alcohol, an alkylene oxide adduct of isooctyl alcohol, an alkylene oxide adduct of nonyl alcohol, an alkylene oxide adduct of isononyl alcohol, an alkylene oxide adduct of decyl alcohol, an alkylene oxide adduct of isodecyl alcohol, an alkylene oxide adduct of undecyl alcohol, an alkylene oxide adduct of isoundecyl alcohol, an alkylene oxide adduct of dodecyl alcohol, an alkylene oxide adduct of isododecyl alcohol, an alkylene oxide adduct of secondary dodecyl alcohol, an alkylene oxide adduct of secondary isododecyl alcohol, an alkylene oxide adduct of tridecyl alcohol, an alkylene oxide adduct of isotridecyl alcohol, an alkylene oxide adduct of secondary tridecyl alcohol, an alkylene oxide adduct of secondary isotridecyl alcohol, an alkylene oxide adduct of tetradecyl alcohol, an alkylene oxide adduct of isotetradecyl alcohol, an alkylene oxide adduct of pentadecyl alcohol, an alkylene oxide adduct of isopentadecyl alcohol, an alkylene oxide adduct of hexadecyl alcohol, an alkylene oxide adduct of isohexadecyl alcohol, an alkylene oxide adduct of octadecyl alcohol, an alkylene oxide adduct of isooctadecyl alcohol, an alkylene oxide adduct of icosanol, and an alkylene oxide adduct of isoicosanol; (2) alkylene oxide adducts of alkylamines, such as an alkylene oxide adduct of octylamine, an alkylene oxide adduct of isooctylamine, an alkylene oxide adduct of nonylamine, an alkylene oxide adduct of isononylamine, an alkylene oxide adduct of decylamine, an alkylene oxide adduct of isodecylamine, an alkylene oxide adduct of undecylamine, an alkylene oxide adduct of isoundecylamine, an alkylene oxide adduct of dodecylamine, an alkylene oxide adduct of isododecylamine, an alkylene oxide adduct of tridecylamine, an alkylene oxide adduct of isotridecylamine, an alkylene oxide adduct of tetradecylamine, an alkylene oxide adduct of isotetradecylamine, an alkylene oxide adduct of pentadecylamine, an alkylene oxide adduct of isopentadecylamine, an alkylene oxide adduct of hexadecylamine, an alkylene oxide adduct of pentadecylamine, an alkylene oxide adduct of octadecylamine, an alkylene oxide adduct of isooctadecylamine, an alkylene oxide adduct of icosylamine, and an alkylene oxide adduct of isoicosylamine; (3) alkylene oxide adducts of cured castor oil and esterified products thereof, such as an alkylene oxide adduct of cured castor oil, an oleic acid ester of an alkylene oxide adduct of cured castor oil, and a stearic acid ester of an alkylene oxide adduct of cured castor oil; (4) alkylene oxide adducts of diols and esterified products thereof, such as an alkylene oxide adduct of bisphenol A, an esterified product of an alkylene oxide adduct of bisphenol A, an alkylene oxide adduct of bisphenol F, an esterified product of an alkylene oxide adduct of bisphenol F, an alkylene oxide adduct of ethylene glycol, an esterified product of an alkylene oxide adduct of ethylene glycol, an alkylene oxide adduct of propylene glycol, an esterified product of an alkylene oxide adduct of propylene glycol, an alkylene oxide adduct of 1,4-butanediol, an esterified product of an alkylene oxide adduct of 1,4-butanediol, an alkylene oxide adduct of 1,6-hexanediol, and an esterified product of an alkylene oxide adduct of 1,6-hexanediol; and (5) ether ester compounds, such as polyoxyethylene octyl decanoate, polyoxyethylene lauryl erucate, polyoxypropylene-1,6-hexanediol dioleate, bispolyoxyethylene decyl adipate, bispolyoxyethylene lauryl adipate, polyoxypropylene benzyl stearate, and copolymers of polyoxyethylene with dimethyl phthalate and lauryl alcohol.

Any known anionic surfactant can be appropriately used as the anionic surfactant. Specific examples of the anionic surfactant include (1) phosphoric acid ester salts of aliphatic alcohols, such as lauryl phosphoric acid ester salts, cetyl phosphoric acid ester salts, octyl phosphoric acid ester salts, oleyl phosphoric acid ester salts, and stearyl phosphoric acid ester salts; (2) phosphoric acid ester salts obtained by adding at least one alkylene oxide selected from ethylene oxide and propylene oxide to aliphatic alcohols such as polyoxyethylene lauryl ether phosphoric acid ester salts, polyoxyethylene oleyl ether phosphoric acid ester salts, and polyoxyethylene stearyl ether phosphoric acid ester salts; (3) aliphatic sulfonic acid salts or aromatic sulfonic acid salts, such as lauryl sulfonic acid salts, myristyl sulfonic acid salts, cetyl sulfonic acid salts, oleyl sulfonic acid salts, stearyl sulfonic acid salts, tetradecane sulfonic acid salts, dodecylbenzene sulfonic acid salts, and secondary alkyl sulfonic acids (C13 to C15) salts; (4) sulfuric acid ester salts of aliphatic alcohols, such as lauryl sulfuric acid ester salts, oleyl sulfuric acid ester salts, and stearyl sulfuric acid ester salts; (5) sulfuric acid ester salts obtained by adding at least one alkylene oxide selected from ethylene oxide and propylene oxide to aliphatic alcohols, such as polyoxyethylene lauryl ether sulfuric acid ester salts, polyoxyalkylene (polyoxyethylene, polyoxypropylene) lauryl ether sulfuric acid ester salts, and polyoxyethylene oleyl ether sulfuric acid ester salts; (6) sulfuric acid ester salts of fatty acids, such as castor oil fatty acid sulfuric acid ester salts, sesame oil fatty acid sulfuric acid ester salts, tall oil fatty acid sulfuric acid ester salts, soybean oil fatty acid sulfuric acid ester salts, rapeseed oil fatty acid sulfuric acid ester salts, palm oil fatty acid sulfuric acid ester salts, lard fatty acid sulfuric acid ester salts, beef tallow fatty acid sulfuric acid ester salts, and whale oil fatty acid sulfuric acid ester salts; (7) sulfuric acid ester salts of oils and fats, such as sulfuric acid ester salts of castor oil, sulfuric acid ester salts of sesame oil, sulfuric acid ester salts of tall oil, sulfuric acid ester salts of soybean oil, sulfuric acid ester salts of rapeseed oil, sulfuric acid ester salts of palm oil, sulfuric acid ester salts of lard, sulfuric acid ester salts of beef tallow, and sulfuric acid ester salts of whale oil; (8) fatty acid salts, such as laurate, oleate, and stearate; and (9) sulfosuccinic acid ester salts of aliphatic alcohols. such as dioctyl sulfosuccinate. Examples of the counter ion of the anionic surfactant include alkali metal salts, such as a potassium salt and a sodium salt, and alkanolamine salts, such as an ammonium salt and triethanolamine.

Any known cationic surfactant can be appropriately used as the cationic surfactant. Specific examples of the cationic surfactant include lauryltrimethylammonium chloride, cetyltrimethylammonium chloride, stearyltrimethylammonium chloride, behenyltrimethylammonium chloride, didecyldimethylammonium chloride, 1,2-dimethylimidazole, and triethanolamine.

Any known amphoteric surfactant can be appropriately used as the amphoteric surfactant. Specific examples of the amphoteric surfactant include betaine-type amphoteric surfactants.

<Silicone>

The treatment agent of the present embodiment may further contain silicone. When the treatment agent contains silicone, spinning smoothness is further improved.

The silicone is not particularly limited, and examples thereof include dimethyl silicone, phenyl-modified silicone, amino-modified silicone, amide-modified silicone, polyether-modified silicone, aminopolyether-modified silicone, alkyl-modified silicone, alkylaralkyl-modified silicone, alkylpolyether-modified silicone, ester-modified silicone, epoxy-modified silicone, carbinol-modified silicone, and mercapto-modified silicone. The viscosity of the silicone is preferably 10 $mm^2/s$ to 100,000 $mm^2/s$ at 25° C.

<Carbon Nanostructure Content>

The content of the carbon nanostructure in the nonvolatile matter of the treatment agent of the present embodiment is preferably 10 ppm or more and less than 50,000 ppm. When this content is 10 ppm or more, the antistatic properties can be further improved. When this content is less than 50,000 ppm, the detachment prevention properties can be further improved.

<Solvent>

The treatment agent of the present embodiment can be mixed with a solvent, if needed, to form a carbon fiber precursor treatment agent-containing composition (hereinafter referred to as "composition"). The solvent has a boiling point of, for example, 105° C. or lower at atmospheric pressure. Examples of the solvent include water and an organic solvent. Specific examples of the organic solvent include lower alcohols, such as ethanol and propanol, and low polar solvents, such as hexane. These solvents may be used singly or in combination of two or more as appropriate. Among them, a polar solvent such as water or a lower alcohol is preferable from the viewpoint of excellent dispersibility or solubility of each component, and water is more preferable from the viewpoint of excellent handleability. The composition preferably contains the treatment agent in an amount of 10 parts by mass or more and 50 parts by mass or less when the sum of the contents of the treatment agent and the solvent in the composition is taken as 100 parts by mass.

Second Embodiment

Next, a second embodiment embodying a carbon fiber precursor according to the present invention will be described. The carbon fiber precursor of the present embodiment has the treatment agent of the first embodiment adhered thereto.

The carbon fiber precursor is preferably a synthetic fiber that is converted into a carbon fiber through a carbonization treatment step described later. The fiber raw material constituting the carbon fiber precursor is not particularly limited, and examples thereof include (1) polyester fibers, such as those of polyethylene terephthalate, polypropylene terephthalate, and polylactic acid ester, (2) polyamide fibers, such as those of nylon 6 and nylon 66, (3) polyacrylic fibers, such as those of polyacrylic and modacrylic, (4) polyolefin fibers, such as those of polyethylene and polypropylene, (5) cellulose fibers, (6) lignin fibers, (7) phenol resin, and (8) pitch. The polyacrylic fiber is preferably primarily composed of polyacrylonitrile, obtained by copolymerizing at least 90 mol % or more of acrylonitrile and 10 mol % or less of a flame retardant promoting component. As the flame retardant promoting component, for example, a vinyl group-containing compound copolymerizable with acrylonitrile can be suitably used.

The amount of the treatment agent of the first embodiment to be adhered to the carbon fiber precursor is not particularly limited, but the treatment agent (excluding solvent) is preferably adhered to the carbon fiber precursor in an amount of 0.1% by mass or more and 2% by mass or less, and more preferably 0.3% by mass or more and 1.2% by mass or less.

Examples of methods for adhering the treatment agent to the carbon fiber precursor include using a known method such as an immersion lubrication method, a spray lubrication method, a roller lubrication method, or a guide lubrication method with a metering pump to adhere either the treatment agent of the first embodiment or a dilution of the composition with water or another solvent.

Next, a method for producing a carbon fiber using the carbon fiber precursor of the present embodiment will be described.

The method for producing a carbon fiber preferably includes the following first to third steps.

The first step is a spinning step of spinning a raw material into a carbon fiber precursor and adhering the treatment agent of the first embodiment.

The second step is a flame-retardant treatment step of converting the carbon fiber precursor obtained in the first step into a flame-retardant fiber in an oxidizing atmosphere at preferably 200° C. or higher and 300° C. or lower, and more preferably 230° C. or higher and 270° C. or lower.

The third step is a carbonization treatment step of carbonizing the flame-retardant fiber obtained in the second step in an inert atmosphere at more preferably 300° C. or higher and 2,000° C. or lower, and still more preferably 300° C. or higher and 1,300° C. or lower.

The second and third steps described above together constitute a firing step.

The treatment agent may be adhered to the raw fiber of the carbon fiber precursor at any stage of the spinning step, but the treatment agent is preferably adhered once before the stretching step. Further, the treatment agent may be adhered again at any stage after the stretching step. For example, the treatment agent may be adhered again immediately after the stretching step, may be adhered again at the winding stage, or may be adhered again immediately before the flame-retardant treatment step.

The oxidizing atmosphere in the flame-retardant treatment step is not particularly limited; for example, an air atmosphere can be used.

The inert atmosphere in the carbonization treatment step is not particularly limited; for example, a nitrogen atmosphere, an argon atmosphere, or a vacuum atmosphere can be used.

Advantages and effects of the treatment agent and the carbon fiber precursor of the present embodiment will be described.

(1) In the present embodiment, the adhesion of the treatment agent to the carbon fiber precursor improves both the detachment prevention properties of the carbon nanostructure and the antistatic properties of the carbon fiber precursor. Additionally, containing silicone in the treatment agent further improves the spinning smoothness of the carbon fiber precursor.

The above embodiments may be modified as follows.

The treatment agent of the present embodiment may further contain any component commonly used in treatment agents, such as a binder, an antioxidant, or an ultraviolet absorber, serving as a stabilizer or an antistatic agent to maintain the quality of the treatment agents, provided that the effects of the present invention are not impaired.

EXAMPLES

Examples will now be provided below to more specifically describe the features and effects of the present invention; however, the present invention is not limited to these examples.

Experimental Part 1<Preparation of Treatment Agent>

Example 1

An aqueous dispersion was prepared by suspending a carbon nanostructure (A) in water. The carbon nanostructure (A) used was zigzag type single-wall carbon nanotubes (A-1), as shown in Table 1. In addition, a surfactant (B), silicone (C), and water were well stirred to prepare an emulsion. The surfactant (B) used was a compound (B-1) obtained by adding 10 mol of ethylene oxide to dodecyl alcohol, as shown in Table 2. The silicone (C) used was an amino-modified silicone (C-1), which has a kinematic viscosity at 25° C. of 80 mm$^2$/s and an amino equivalent of 4,000 g/mol, as shown in Table 3. As for the contents of the surfactant (B) and the silicone (C) in the emulsion, the blending amount of the surfactant (B) was 30 parts by mass, and the blending amount of the silicone (C) was 70 parts by mass, as shown in Table 4. The aqueous dispersion and the emulsion were mixed and stirred well to prepare a composition containing a treatment agent of Example 1, composed of the components (A) to (C) and a solvent. The mixing ratio between the aqueous dispersion and the emulsion was adjusted so that the content of the carbon nanostructure (A) would be 1,000 ppm when the sum of the contents of the surfactant (B) and the silicone (C) is taken as 100 parts by mass. The content (=A/(A+B+C)) (mass ratio) of the carbon nanostructure (A) in the nonvolatile matter of the treatment agent is about 999 ppm.

The nonvolatile matter, as used herein, refers to absolute dry matter which is the residue after the treatment agent has been heat-treated at 105° C. for 2 hours to sufficiently remove volatile substances.

Examples 2 to 14 and Comparative Examples 1 to 5

The treatment agents of Examples 2 to 14 and Comparative Examples 1 to 5 were prepared in the same manner as in Example 1, using the components shown in Tables 1 to 3 at the ratios shown in Table 4.

The type of the carbon nanostructure (A) and the content thereof in the nonvolatile matter of the treatment agent, the type of the surfactant (B) and the content thereof (parts by mass) with respect to the silicone (C), and the type of the silicone (C) and the content thereof (parts by mass) with respect to the surfactant (B) in the treatment agents of Examples and Comparative Examples are as shown in the "Carbon nanostructure (A)" column, the "Surfactant (B)" column, and the "Silicone (C)" column of Table 4.

TABLE 1

| Section | Carbon nanostructure (A) |
|---|---|
| A-1 | Zigzag type single-wall carbon nanotube |
| A-2 | Armchair type single-wall carbon nanotube |
| A-3 | Chiral type single-wall carbon nanotube |
| A-4 | Single-wall carbon nanotube (manufactured by Nanocyl SA: Aldrich product number 755710) |
| A-5 | Single-wall carbon nanotube (SWCNT) 80% (manufactured by OCSiAl, trade name: TUBALL) |
| A-6 | Single-wall carbon nanotube (SWCNT) 93% (manufactured by OCSiAl, trade name: TUBALL) |
| A-7 | Double-wall carbon nanotube (manufactured by Nanocyl SA: Aldrich product number 755141) |
| A-8 | Multi-wall carbon nanotube (manufactured by Nanocyl SA: Aldrich product number 755133) |
| A-9 | Carboxyl group-modified multi-wall carbon nanotube (manufactured by Nanocyl SA: Aldrich product number 755125) |
| A-10 | Carbon nanofiber for reinforcement (manufactured by ALMEDIO Inc.) |
| A-11 | Carbon black having average primary particle size of 23 nm |

TABLE 2

| Section | Surfactant (B) |
|---|---|
| B-1 | Compound obtained by adding 10 mol of ethylene oxide to dodecyl alcohol |
| B-2 | Compound obtained by adding 15 mol of ethylene oxide to isononyl alcohol |
| B-3 | Compound obtained by adding 10 mol of ethylene oxide and 5 mol of propylene oxide to tetradecyl alcohol |
| B-4 | Compound obtained by adding 7 mol of ethylene oxide to secondary dodecyl alcohol |
| B-5 | Sodium dodecylbenzenesulfonate |
| B-6 | Copolymer of polyethylene glycol having average molecular weight of 2,000, dimethyl terephthalate, and lauryl alcohol |
| B-7 | Block copolymerized polyether (manufactured by ADEKA Corporation, trade name: F-68) |
| B-8 | Bisphenol A-ethylene oxide 2 mol adduct dilaurate |

TABLE 3

| Section | Silicone (C) |
|---|---|
| C-1 | Amino-modified silicone having kinematic viscosity at 25° C. of 80 mm$^2$/s and amino equivalent of 4,000 |
| C-2 | Amino-modified silicone having kinematic viscosity at 25° C. of 650 mm$^2$/s and amino equivalent of 2,000 |
| C-3 | Amino-modified silicone having kinematic viscosity at 25° C. of 3,000 mm$^2$/s and amino equivalent of 7,000 |
| C-4 | Amino-modified silicone having kinematic viscosity at 25° C. of 1,500 mm$^2$/s and amino equivalent of 3,800 |
| C-5 | Amino-modified silicone having kinematic viscosity at 25° C. of 5,000 mm$^2$/s and amino equivalent of 6,000 |
| C-6 | Polyether-modified silicone having kinematic viscosity at 25° C. of 500 mm$^2$/s and weight ratio of silicone chain/polyether = 50/50, and including polyether moiety having molar ratio of ethylene oxide/propylene oxide = 50/50 |
| C-7 | Dimethyl silicone having kinematic viscosity at 25° C. of 100 mm$^2$/s |

TABLE 4

| | Carbon nanostructure (A) | | | Surfactant (B) | | Silicone (C) | | Evaluation | | |
|---|---|---|---|---|---|---|---|---|---|---|
| | Type | Content (ppm) (A/(B + C)) | Content (ppm) (A/(A + B + C)) | Type | Parts by mass | Type | Parts by mass | Detachment prevention properties | Spinning smoothness | Antistatic properties |
| Example 1 | A-1 | 1000 | 999 | B-1 | 30 | C-1 | 70 | ◎ | ◎ | ◎ |
| Example 2 | A-2 | 4000 | 3984 | B-1<br>B-2 | 25<br>25 | C-2 | 50 | ◎ | ◎ | ◎ |
| Example 3 | A-3 | 2000 | 1996 | B-3 | 70 | C-3 | 30 | ◎ | ◎ | ◎ |
| Example 4 | A-3 | 1500 | 1498 | B-3<br>B-4 | 5<br>5 | C-1 | 90 | ◎ | ◎ | ◎ |
| Example 5 | A-4 | 700 | 700 | B-1<br>B-3 | 10<br>10 | C-1<br>C-3 | 50<br>30 | ◎ | ◎ | ◎ |
| Example 6 | A-5 | 3000 | 2991 | B-4<br>B-5 | 85<br>5 | C-4 | 10 | ◎ | ◎ | ◎ |
| Example 7 | A-6 | 300 | 300 | B-1<br>B-6 | 55<br>5 | C-5 | 40 | ◎ | ◎ | ◎ |
| Example 8 | A-5 | 8000 | 7937 | B-4 | 90 | C-4 | 10 | ◎ | ◎ | ◎ |
| Example 9 | A-6 | 100 | 100 | B-1<br>B-4 | 20<br>40 | C-5 | 40 | ◎ | ◎ | ◎ |
| Example 10 | A-7 | 1000 | 999 | B-4<br>B-5 | 45<br>5 | C-6 | 50 | ◎ | ◎ | ○ |
| Example 11 | A-8 | 5000 | 4975 | B-1<br>B-6 | 30<br>5 | C-7 | 65 | ◎ | ◎ | ○ |
| Example 12 | A-9 | 30 | 30 | B-2<br>B-3<br>B-8 | 30<br>10<br>60 | — | — | ◎ | ○ | ○ |
| Example 13 | A-10 | 40000 | 38462 | B-2<br>B-4 | 30<br>70 | — | — | ○ | ○ | ○ |
| Example 14 | A-11 | 4000 | 3984 | B-2<br>B-4 | 30<br>70 | — | — | ○ | ○ | ○ |
| Comparative Example 1 | — | — | — | B-1 | 30 | C-5 | 70 | ◎ | ◎ | X |
| Comparative Example 2 | A-1 | 5 | 5 | B-1 | 30 | C-5 | 70 | ◎ | ◎ | X |
| Comparative Example 3 | A-11 | 111111 | 100000 | B-7 | 45 | C-5 | 55 | X | ◎ | ◎ |
| Comparative Example 4 | A-1 | 1000 | 999 | — | — | C-1 | 100 | X | ◎ | ◎ |
| Comparative Example 5 | A-1 | 1000000 | 1000000 | — | — | — | — | — | — | — |

Experimental Part 2<Production of Carbon Fiber Precursor>

A carbon fiber precursor was produced using the treatment agent prepared in Experimental Part 1.

A copolymer which is composed of 95% by mass of acrylonitrile, 3.5% by mass of methyl acrylate, and 1.5% by mass of methacrylic acid and has a limiting viscosity of 1.80 was dissolved in dimethylacetamide (DMAC) to prepare a spinning dope having a polymer concentration of 21.0% by mass and a viscosity of 500 poise at 60° C. The spinning dope was extruded at a draft ratio of 0.8 from a spinneret having a hole diameter (inner diameter) of 0.075 mm and a number of holes of 12,000 into a coagulation bath containing a 70% by mass aqueous DMAC solution kept at a spinning bath temperature of 35° C.

The coagulated yarn was stretched five times in a water washing tank, simultaneously with desolvation, to produce a water-swollen acrylic fiber strand (carbon fiber precursor). The acrylic fiber strand was lubricated with the composition prepared in Experimental Part 1 so that the adhesion amount of the solid content was 1% by mass (containing no solvent). The lubrication with the composition was performed by an immersion lubrication method using a 4% diluted liquid of a treatment agent obtained by further diluting the composition with ion-exchanged water. Thereafter, the acrylic fiber strand was subjected to a dry densification treatment with heating rollers at 130° C., further stretched 1.7 times between heating rollers at 170° C., and then wound onto a take-up winder using a winding device.

Experimental Part 3<Evaluation>

(Detachment Prevention Properties)

The detachment of the carbon nanostructure (A) on the surface of the roller was visually observed immediately before starting the dry densification treatment in the spinning step and evaluated according to the following criteria. The results are shown in the "Detachment prevention properties" column of Table 4.

◎ (good): Hardly any detachment was observed.
○ (acceptable): A small amount of detachment was observed, but it did not affect the operation.
x (poor): There were many detachments, and frequent cleaning was required.

(Antistatic Properties)

The electricity generated immediately before the take-up winder in the spinning step was measured with a digital electrostatic potential measuring device, KSD-1000 (manufactured by Kasuga Denki, Inc.), and evaluated according to the following criteria. The results are shown in the "Antistatic properties" column of Table 4.

◎ (good): less than 3 kV
○ (acceptable): 3 kV or more and less than 5 kV x (poor): 5 kV or more
(Spinning Smoothness)

The presence or absence of breakage of the single yarn in the take-up winder during the spinning step was evaluated according to the following criteria. The results are shown in the "Spinning smoothness" column of Table 4.

- ⊚ (good): No yarn breakage was observed when the take-up winder was inspected after spinning the yarn for 24 hours.
- ○ (acceptable): Slight yarn breakage was observed when the take-up winder was inspected after spinning the yarn for 24 hours, but it did not affect the operation.
- x (poor): Yarn breakage was observed in the take-up winder immediately after the start of spinning, causing operational problems.

As is apparent from the evaluation results of Examples as compared with Comparative Examples in Table 4, the treatment agent of the present invention succeeds in preventing the detachment of the carbon nanostructure from the carbon fiber precursor while improving the antistatic properties of the carbon fiber precursor. In addition, it is possible to improve the spinning smoothness of the carbon fiber precursor to which the treatment agent is applied. In Comparative Example 5, since the carbon nanostructure cannot be applied to the carbon fiber precursor, no evaluations were performed.

The invention claimed is:

1. A carbon fiber precursor treatment agent comprising:
   a carbon nanostructure; and
   a surfactant, wherein the carbon nanostructure is present in the nonvolatile matter of the carbon fiber precursor treatment agent at a content of 10 ppm or more and less than or equal to 38462 ppm.

2. The carbon fiber precursor treatment agent according to claim 1, wherein the carbon nanostructure contains a carbon nanotube.

3. The carbon fiber precursor treatment agent according to claim 2, wherein the carbon nanotube is a single-wall carbon nanotube.

4. The carbon fiber precursor treatment agent according to claim 1, further comprising silicone.

5. A carbon fiber precursor treatment agent-containing composition comprising the carbon fiber precursor treatment agent according to claim 1 and a solvent.

6. A carbon fiber precursor to which the carbon fiber precursor treatment agent according to claim 1 is adhered.

* * * * *